April 18, 1967 W. J. BROREIN 3,315,040

RETRACTILE CORD GROMMET FOR TELEPHONE SUBSCRIBER HAND SETS

Filed Oct. 29, 1963

INVENTOR

William J. Brorein

BY

Emery, Whittemore, Sandoe & Graham

ATTORNEYS.

United States Patent Office 3,315,040
Patented Apr. 18, 1967

3,315,040
RETRACTILE CORD GROMMET FOR TELEPHONE SUBSCRIBER HAND SETS
William J. Brorein, Whippany, N.J., assignor to General Cable Corporation, New York, N.Y., a corporation of New Jersey
Filed Oct. 29, 1963, Ser. No. 319,798
10 Claims. (Cl. 179—100)

This invention relates to cords for hand sets of telephones and more especially to the connecting of the cords with the hand sets so as to protect insulating jackets of the cords from damage resulting from bending and abrasion with repeated liftings of the hand set from the base of the telephone.

It is an object of the invention to provide an improved combination of a telephone receiver or hand set with its cord for longer useful life of the cord.

A more specific object of the invention is to provide a connection between a telephone hand set and its cord with an improved grommet at the location where the cord passes through the housing of the hand set. The improvement relates to the shape of the grommet, to the connection of the grommet with the cord, and to the securing of the grommet to the hand set.

In the preferred embodiment of the invention there is a stay band that clamps the grommet to the cord and that also connects both the grommet and the cord to the hand set. In the case of helical, retractable cords, the grommet extends to the helix to facilitate coiling of the cord.

Other objects, features and advantages of the invention will appear or be pointed out as the description proceeds.

In the drawing, forming a part hereof, in which like reference characters indicate corresponding parts in all the views.

Figures 1, 2, 3:
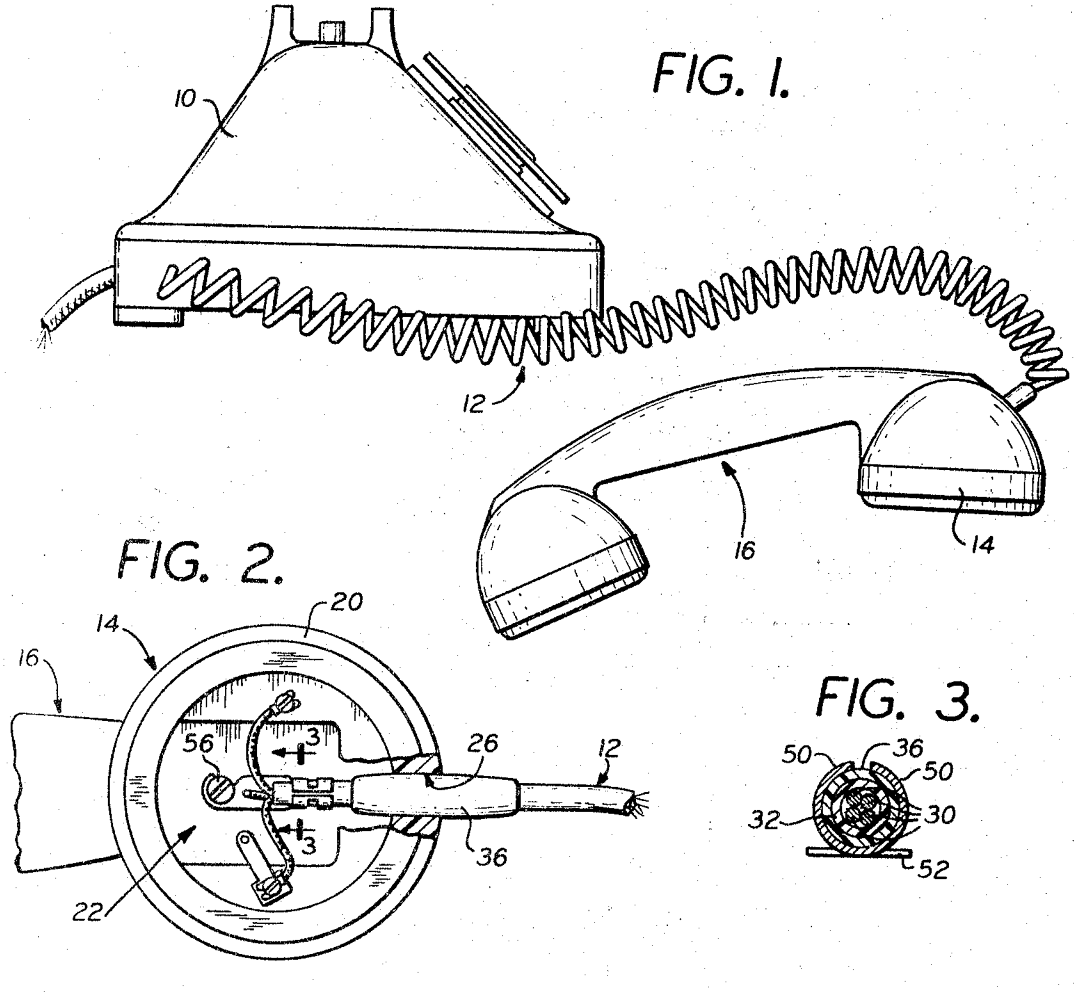
FIGURE 1 is a fragmentary view showing a portion of a telephone and a hand set of the telephone connected to the base by a retractable cord constructed in accordance with this invention.
FIGURE 2 is a greatly enlarged sectional view showing the connection of the cord to the telephone hand set of FIGURE 1.
FIGURE 3 is a greatly enlarged sectional view taken on the line 3—3 of FIGURE 2.

FIGURE 1 shows a base 10 of a telephone from which a cord 12 extends to a telephone hand set 16, which usually houses the transmitter and receiver, but which might also have other configurations and house switches, dials and other apparatus which connect to the cord conductors.

The invention is intended primarily for use with retractable cords having highly flexible conductors and having the insulating jacket of the cord molded to a helical contour which causes the cord to retract into a close helix when not pulled into an extended condition by moving the hand set 16 away from the base 10 for a greater distance than the retracted length of the cord 12.

FIGURE 2 shows the transmitted end of the hand set 16. The hand set includes a housing 20 which includes a transmitter assembly 22 held firmly in the housing and having a fixed relation to the housing. There is an opening 26 in the housing 20 for entrance of the cord 12 into the housing.

Figure 4:
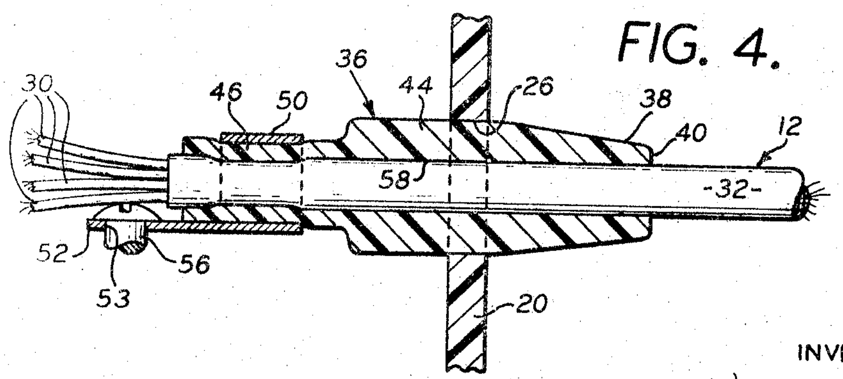
FIGURE 4 is an enlarged sectional view taken through the end of the cord shown in the other figures and showing the position of the grommet on the cord and the clamping of the grommet to the cord by a stay band.

FIGURES 3 and 4 show the construction of the end portion of the cord 12. There are a plurality of individually insulated conductors 30 contained within the cord and these insulated conductors 30 are surrounded by an outer insulating jacket 32. In order to prevent sharp bending of the cord, where it passes through the opening 26, and to prevent abrasion of the jacket of the cord 12 at the opening 26, there is a grommet 36 which fits closely around the jacket 32 and which has an outside diameter sufficient to substantially fill the opening 26.

The grommet 36 extends for some distance beyond the opening 26 in both directions. It has an outer portion 38 which extends along the outside surface of the jacket 32. This outer portion 38 has its outside surface converging to a reduced outside diameter at the outer end of the grommet 36. The inside diameter of the grommet 36 is substantially uniform throughout the length of the grommet so that the converging surface of the outer portion 38 produces a reduced radial thickness of the wall of the grommet toward the outer end; and since the grommet 36 is made of resilient and flexible material, this reduced radial thickness gives the grommet increased flexibility toward its outer end and this prevents the cord 12 from bending as sharply as would be the case with a stiff grommet. To further eliminate sharp bending of the cord 12, the outer portion 38 of the grommet has a curved lip 40 which approaches an included angle somewhat less than 180° as shown in FIGURE 4.

The grommet 36 has a body portion 44 of substantially uniform diameter and wall thickness where it extends through the opening 26 and for some distance inward beyond the opening 26.

Toward its inner end, the grommet 36 has an inner portion 46 which is of less outside diameter than the body portion 44. A stay band 50 is clamped around the inner portion 46 and this stay band 50 not only grips the grommet tightly, with resulting compression and distortion of the inner portion 46, but it also clamps the grommet tightly on the jacket 32 of the cord 12 with some compression and distortion of the jacket 32. The grommet 36 and the jacket 32 are preferably made of plastic; and in the preferred construction, the grommet 36 is somewhat harder than the jacket 32. This result can be obtained by using less plasticizer in the material of the grommet. Experience has shown that longer life of the cords is obtained by having the grommet somewhat harder than the jacket. The use of the harder grommet has the additional advantage that there is less tendency for the grommet to deform when molding the cord 12 to produce the helical contour. The term "mold" is used herein in a broad sense since the operation is actually performed by a heat treatment of the cord when wrapped around a mandrel. This makes practical the applying of the grommet to the cord before the curing operation.

It is a feature of the construction that the neck or inner portion 46 of the grommet 36 extends to substantially the end of the jacket 32. This provides protection for the jacket at one of the points of greatest stress. The stay band 50, which is spaced a slight distance back from the inner end of the grommet 36, has a flat lug 52 with an opening 53 for receiving fastening means, such as a screw 56 (FIGURE 2) for connecting the stay band 50 and the assembled cord 12 to the hand set assembly 22.

The lug 52 is preferably of one-piece construction with the remainder of the stay band 50 and in the preferred construction the stay band 50 is made of stiff but malleable metal which is formed into semi-circular portions that tightly grip the jacket 32 around most of the circumference of the jacket, as shown in FIGURE 3.

When the grommet 36 is applied to the jacket 32 before curing of the cord 12, the confronting faces of the grommet 36 and jacket 32, that is, the inside surface of the grommet 36 and the outside surface of the jacket 32 can be bonded to one another by the heat treatment and these bonded areas are indicated by heavy lines and the reference character 58 in FIGURE 4. This provides a connection between the grommet 36 and the cord 12 in addition to the clamping of the grommet to the cord by radial pressure of the stay band 50. It is not a substitute for the stay band, however, because the firm adherence of the stay band to the grommet is necessary to prevent movement of the grommet 36 with respect to the screw 56.

The preferred embodiment of the invention has been illustrated and described, but changes and modifications can be made and some features can be used in different combinations without departing from the invention as defined in the claims.

What is claimed is:

1. The combination with a telephone hand set that has a housing for apparatus within the housing including a receiver and transmitter assembly, of a cord including a plurality of insulated conductors covered by an outer insulation jacket, the cord passing through an opening in the housing, a grommet surrounding the cord where the cord passes through said opening and for some distance along the jacket in both directions beyond said opening, the grommet having an inside diameter substantially uniform throughout its length and having a main body portion of substantially uniform outside diameter and substantially uniform radial thickness extending through and in both directions beyond the opening in the housing, said grommet also having an inner end portion within the housing of less radial thickness than the radial thickness of the grommet where it passes through the opening, a stay band clamped over said inner end portion of the grommet clamping the grommet tightly on the jacket, and means connecting the stay band with the hand set assembly.

2. The combination described in claim 1 characterized by the telephone receiver and transmitter and other apparatus being part of a telephone hand set, the grommet being clamped to the jacket of the cord by the stay band, and the cross section of the stay band on the grommet being small enough to pass through the housing opening through which the grommet extends.

3. The combination described in claim 2 characterized by the grommet substantially filling the opening in the housing through which the grommet extends, and the inner end of the grommet extending substantially to the end of the jacket of the cord.

4. The combination described in claim 2 characterized by the grommet having an outer portion which extends outwardly beyond the opening through the housing and which has its outside surface tapering to a reduced outside diameter of the grommet toward the outer end thereof.

5. The combination described in claim 4 characterized by the cord being a retractable cord of helical shape and the grommet extending at its outer end to the beginning of the first convolution of the cord.

6. The combination described in claim 2 characterized by the jacket and grommet being made of plastic material and the grommet being somewhat harder than the jacket and bonded to the jacket by adhesion of confronting faces of the grommet and jacket, and the cord being a retractable helical cord.

7. A telephone hand set cord including a plurality of insulated conductors surrounded by an outer insulating jacket, a grommet having an inside diameter substantially uniform throughout its length covering the jacket adjacent to one end thereof, a stay band around an end portion of the grommet nearest to the end of the jacket and clamping the grommet to the jacket, the stay band having a portion extending longitudinally of the grommet and jacket and beyond the ends of said grommet and jacket for connecting the cord with a fixed portion of the inside of a telephone hand set.

8. The telephone hand set cord described in claim 7 characterized by the cord being a retractable cord with highly flexible conductors, and the jacket being molded to a helical shape throughout all of its length except for short end portions, the grommet at one end of the cord extending along substantially the entire length of the end portion beyond the helical part of the cord.

9. A grommet for a telephone hand set including a sleeve made of resilient material having an inside diameter substantially uniform throughout its length and having a main body portion of substantially uniform outside diameter and substantially uniform radial thickness, and having an inner end portion of substantially uniform radial thickness extending beyond the body portion and with an outside diameter less than that of the body portion for receiving a stay band to clamp the grommet to a jacket of a cord contained within the grommet.

10. The grommet described in claim 9 characterized by the grommet having also an outer end portion beyond the body portion and with an outside surface that converges along a taper to a reduced outside diameter at the end of the outer end portion remote from said body portion.

References Cited by the Examiner

UNITED STATES PATENTS

| | | | |
|---|---|---|---|
| Re. 24,438 | 2/1958 | Moorhead | 339—103 |
| 2,101,713 | 12/1937 | Jolliffe | 339—101 |
| 2,225,472 | 12/1940 | Franklin | 339—103 |
| 2,727,088 | 12/1955 | Wall | 174—135 |
| 2,795,641 | 6/1957 | Rowell | 339—101 X |

KATHLEEN H. CLAFFY, *Primary Examiner.*

J. W. JOHNSON, H. ZELLER, *Assistant Examiners.*

Disclaimer

3,315,040. —*William J. Brorein,* Whippany, N.J. RETRACTILE CORD GROMMET FOR TELEPHONE SUBSCRIBER HAND SETS. Patent dated Apr. 18, 1967. Disclaimer filed May 17, 1979, by the assignee, *GK Technologies, Inc.*

Hereby enters this disclaimer to the remaining term of said patent.

[*Official Gazette December 14, 1982.*]